(12) United States Patent
Lotz et al.

(10) Patent No.: US 6,180,155 B1
(45) Date of Patent: Jan. 30, 2001

(54) SWEETENER HAVING AN IMPROVED SUCROSE-LIKE TASTE AND PROCESS FOR THE PREPARATION THEREOF AND USE THEREOF

(75) Inventors: Andreas Lotz; Manfred Böhshar, both of Kelkheim (DE)

(73) Assignee: Nufrinova GmbH (DE)

( * ) Notice: Under 35 U.S.C. 154(b), the term of this patent shall be extended for 0 days.

(21) Appl. No.: 09/014,545

(22) Filed: Jan. 28, 1998

Related U.S. Application Data

(63) Continuation of application No. 08/436,889, filed on May 8, 1995.

(30) Foreign Application Priority Data

May 10, 1994 (DE) ................................................ 44 16 429

(51) Int. Cl.[7] ...................................................... A23L 1/236
(52) U.S. Cl. ........................................... 426/548; 426/804
(58) Field of Search ..................................... 426/548, 658, 426/804

(56) References Cited

U.S. PATENT DOCUMENTS

| | | |
|---|---|---|
| 4,096,285 | 6/1978 | Burge et al. . |
| 4,122,205 | 10/1978 | Burge et al. . |
| 4,158,068 | 6/1979 | von Rymon Lipinski et al. . |
| 4,228,198 | 10/1980 | Burge et al. . |
| 5,164,214 | 11/1992 | Wild . |

FOREIGN PATENT DOCUMENTS

| | | |
|---|---|---|
| 2 060 634 | 2/1973 | (DE) . |
| 25 56 109 | 6/1977 | (DE) . |
| 2 628 294 | 4/1978 | (DE) . |
| 3 331 517 | 3/1984 | (DE) . |
| 2 556 109 | 5/1984 | (DE) . |
| 2 560 544 | 5/1986 | (DE) . |
| 0 065 462 | 11/1982 | (EP) . |
| 0 319 984 | 3/1992 | (EP) . |
| 2 479 656 | 10/1981 | (FR) . |
| 1 287 373 | 8/1972 | (GB) . |
| 59-154956 | 9/1984 | (JP) . |
| 89 04165 | 5/1989 | (WO) . |

OTHER PUBLICATIONS

Rymon Lipinski and Schiwerk: *Handbuch Subungsmittel*, Behr's Verlag, 1991, pp. 46–47.
*Appl. Biochemistry and Microbiology* 28 (1):97–100 (1992).
*Zeitschrift für Lebensmitteluntersuchung und Forschung* 195 (2):112–119 (1992).

*Primary Examiner*—Leslie Wong
(74) *Attorney, Agent, or Firm*—Connolly Bove Lodge & Hutz LLP

(57) ABSTRACT

Sweetener having an improved sucrose-like taste and process for the preparation thereof and use thereof. A sweetener having improved sucrose-like taste which contains at least one synthetic sweetener or a mixture of different artificial sweeteners and at least one deoxysugar, in particular rhamnose or fucose. A process for the preparation of this sweetener and use thereof for the production of artificial sweeteners for table use, for sweetening foods and for improving flavor development in foods

11 Claims, No Drawings

SWEETENER HAVING AN IMPROVED SUCROSE-LIKE TASTE AND PROCESS FOR THE PREPARATION THEREOF AND USE THEREOF

This is a continuation of our copending application Ser. No. 08/436,889, filed May 8, 1995.

FIELD OF THE INVENTION

The invention relates to a sweetener having an improved sucrose-like taste and a process for the preparation and use of this sweetener.

DESCRIPTION OF THE PRIOR ART

Artificial sweeteners having a low nutritive value are increasingly being used instead of sugar to decrease the intake of calories for dietetic or medical reasons. As is known, they are distinguished by a very much greater sweetening power than the naturally occurring sugars. They are therefore very highly suitable for sweetening foods and beverages. It is a disadvantage that all artificial sweeteners when set in a relatively strong sweetness show some degree of a foreign taste. The taste quality of the sweetness also generally deviates from that of sucrose which has become the model for the evaluation of sweetness owing to long habituation.

To mask the foreign taste, a number of various non-sweet-tasting additives such as maltol, ethylmaltol, citric acid, tartaric acid or quinine sulfate have been previously added to the artificial sweeteners (DE-A 20 60 634). These compounds have principally been described to mask the foreign taste of saccharin. In addition, modified artificial sweeteners are disclosed by DE-C 25 60 544 and DE-A 25 56 109. Here, taste modifiers such as potassium aluminum sulfate or naringin are added to known artificial sweeteners such as aspartame and cyclamate in order to modify the aftertaste of the artificial sweeteners.

To improve the taste quality of artificial sweeteners, mixtures of artificial sweeteners are also used. DE-B 26 28 294 discloses artificial-sweetener mixtures having an improved sucrose-like taste. It is described herein that the quality of the artificial sweeteners and the similarity to sucrose of the artificial sweeteners may be improved by mixing with other artificial sweeteners. A reason for the use of mixtures of artificial sweeteners is that some of the known artificial sweeteners develop their sweetness on the tongue in a highly delayed manner or else produce a very rapid impression of sweetness which also subsides rapidly, however. This disadvantage may be substantially compensated for by adding artificial sweeteners having a sweetness which persists for a relatively long time or if appropriate by mixing with natural sugar. To improve the similarity to sucrose, in DE-B 26 28 294, an artificial-sweetener mixture of 3,4-dihydroxy-6-methyl-1,2,3-oxathiazin-4-one 2,2-dioxide (acesulfame) with another of the known artificial sweeteners such as aspartame, saccharin and cyclamate is proposed. In EP 3 19 984 B1, the similarity to sucrose of the taste of artificial-sweetener mixtures in improved still further by mixing with at least one synthetic sweetener with dearomatized and concentrated fruit preparations of 60 to 80° Brix. By mixing artificial sweetener with sweet-tasting carbohydrates in this case an improvement in the taste of artificial-sweetener mixtures is achieved. JP 59/154956 discloses a sweetener of acesulfame-K and fructose. In addition, DE-A 33 31 517 discloses sweeteners which comprise mixtures of acesulfame-K with, inter alia, lactose or fructose. In this case too, by mixing artificial sweeteners with sweet-tasting carbohydrates, an improvement in the similarity to sucrose in the intended result.

Rhamnose is known as a starting product for the preparation of 2,5-dimethyl-4-hydroxy-3(2H)-furanone. This substance is an important impact component in many fruit aromas and in therefore frequently used in aroma compositions for the food industry. Furthermore it is known that rhamnose can be used as starting substance for reaction aromas. In addition to the formation of furaneol, the formation of 5-methylfurfural and other Maillard reaction products from rhamnose and nitrogen-containing compounds is also described in the literature (A. F. Pisarnitskii et al., Applied Biochemistry and Microbiology 28 (1), 97 to 100 (1992); R. Silwar, Zeitechrift für Lebensmitteluntersuchung und -Forschung 195 (2), 112 to 119 (1992)).

Rhamnose has a considerably lower sweetening power than sucrose. Therefore this compound is not used for sweetening foods either.

In the literature, the term "full sweetness" is frequently described (by Rymon Lipinski and Schiwerk: Handbuch S üfungsmittel [Sweetener Handbook], Behr's Verlag 1991; Nabors, L. O. and Gelardi R. W.: Alternative Sweeteners, Marcel Dekker Inc., 1991). This term in meant to express the fact that this is a harmonious and full-bodied sweetness. In contrast thereto, a "watery sweetness" is described as flat and without body and cannot be closely compared with that of sucrose.

The object of the present invention is to prepare a sweetener which has a harmonious and full-bodied sweetness which is comparable with that of sucrose and which in addition improves the taste quality of foods sweetened with it by intensifying the aroma development, and to specify a process for the preparation thereof and use thereof.

SUMMARY OF THE INVENTION

It has now surprisingly been discovered that deoxysugars, in particular rhamnose or fucose, in low dosage concentrations can improve the similarity to sucrose of intensive sweeteners.

Furthermore it is shown that, owing to the addition of deoxysugars such as rhamnose or fucose, foods sweetened with artificial sweeteners taste bettor. A more complete development of the aroma results. In addition to the improvement of the similarity to sucrose, owing to the addition of rhamnose, the flavor quality of foods sweetened with artificial sweetener also improves. This type of aroma enhancement by the addition of rhamnose without the addition of heat was not known hitherto.

The object posed is therefore achieved by a sweetener of the type mentioned at the outset which a) contains at least one artificial sweetener or a mixture of different artificial sweeteners and b) contains at least one deoxysugar.

The mixture components a) and b) are present in a ratio within 1:1000 to 1000:1, preferably within 10:1 to 1:10 parts by weight.

The component a) in the sweetener according to the invention is preferably acesulfame-K, aspartame, sodium cyclamate, saccharin, neohesperidin dihydrochalcone, trichlorogalactosucrose, alitane, thaumatin or stevioside. Either one or a plurality of these artificial sweeteners can be used for mixing with the component.

Preference is given to the use as component a) of acesulfame-K alone, a mixture of acesulfame-K and aspartame or a mixture of acesulfame and sodium cyclamate.

Component b) is preferably rhamnose or fucose.

DETAILED DESCRIPTION

There are various potential methods for the preparation of rhamnose. On the one hand, rhamnose can be isolated from constituents of plant materials such as rutin, naringin or hesperidin after cleavage of the glycosidic bonds. On the other hand, rhamnose can also be produced by biotechnology from plant raw materials (U.S. Pat. No. 4,933,281). Rhamnose is generally used as L-rhamnose monohydrate. This substance occurs in crystalline form.

To prepare the abovementioned sweetener, the individual artificial sweeteners or artificial-sweetener mixtures can then be mixed with rhamnose in pulverulent form. Alternatively, an aqueous artificial sweetener solution can also be prepared from the abovementioned artificial sweeteners and rhamnose. In addition, this solution can be spray-dried in order to obtain a corresponding sweetener powder having improved sucrose-like taste.

The sweetener thus prepared can be used, inter alia, to produce artificial sweeteners for table use.

The sweetener according to the present invention can further be used in the home or in industrial food production for sweetening foods, in particular for sweetening liquid foods such as soft drinks or dairy products or ice products both in solid form and as a solution. In addition, all other foods such as bakery products, desserts and delicatessen products can also be sweetened therewith.

The sweetener according to the present invention is used in foods usually in a concentration of 1 to 5000 mg/kg of ready-to-eat food. The mixture partner b) is used in comparable concentrations, preferably in a concentration of 100 to 2000 mg/kg.

The sweetener according to the invention can optionally be added to the food as a finished mixture of the components a) and b) or the components a) and b) of the sweetener can be added to the food sequentially.

The invention is described in more detail with reference to the examples below.

In each case, six test persons were given the task of taste evaluation of foods sweetened in different ways.

In the test, the taste profile of the foods was evaluated by descriptive sensory analysis, the sweetness properties in particular being evaluated on the basis of the criteria "full sweetness", "empty sweetness", "acute sweetness" and "persistent sweetness". In addition, foreign taste components such as astringent and bitter were assessed. This type of descriptive sensory test method has been described many times in the literature (Stone, H. and J. L. Sidel, Sensory Evaluation Practise, Academic Press, 1993).

Examples

1. Production of lemonade to the following formulas:

A) 1.9 g of citric acid monohydrate
   0.8 g of lemon flavoring
   0.3 g of acesulfame-K make up to 1000 g with water B) as A) plus 500 ppm of L-rhamnose monohydrate Result:

|  | A) | B) |
|---|---|---|
| Sweetness: | Empty, acute sweetness | Full, persistent sweetness |
| Flavor: | Lemon perceptible | Lemon markedly perceptible |

2. Production of fruit yoghurt to the following formulas:

A) 0.16 g/kg of acesulfame-K
   0.16 g/kg of aspartame
   70 g/kg of strawberry fruit preparation
   930 g/kg of skimmed-milk yoghurt (1.5% fat)

B) as A) plus 400 ppm of L-rhamnose monohydrate

Result:

|  | A) | B) |
|---|---|---|
| Sweetness: | Empty sweetness | Full sweetness |
| Flavor: | Markedly perceptible | Strawberry flavor more strongly evident |

3. Production of skimmed milk drink to the following formulas:

A) 0.33 g/kg of acesulfame-K
   0.11 g/kg of aspartame
   60 g/kg of flavored powder make up to 1000 g with skimmed milk (1.5% fat)

B) as A) plus 700 ppm of L-rhamnose monohydrate

Result:

|  | A) | B) |
|---|---|---|
| Sweetness: | Empty sweetness | Full sweetness |
| Flavor: | Markedly perceptible | Stronger flavor |

4. Production of an apple fruit-juice drink to the following formulas:

A) 15 g/l of drink base
   apple flavoring in an appropriate amount
   1.0 g of citric acid monohydrate
   0.2 g of sodium saccharin
   0.3 g of citrus pectin
   Make up to 1000 g with water B) as A) plus 300 ppm of L-rhamnose monohydrate Result

|  | A) | B) |
|---|---|---|
| Sweetness: | Very rapid sweetness impression which also subsides rapidly | Longer-persisting sweetness |

-continued

|  | A) | B) |
|---|---|---|
| Foreign taste components: | Bitter and metallic aftertaste | No bitter aftertaste detectable, metallic aftertaste less pronounced |
| Flavor: | Perceptible | Stronger release of flavor |

What is claimed is:

1. A method for modifying the taste profile of a taste-unmodified, acesulfame K-containing sweetener composition, so that the resulting modified sweetener composition more closely resembles the taste profile of sucrose, said method comprising, modifying said unmodified, acesulfame K-containing sweetener composition by adding an amount of rhamnose to said unmodified, acesulfame K-containing sweetener composition, which amount is sufficient to cause the taste profile imparted by acesulfame K to more closely resemble the taste profile of sucrose, and obtaining thereby said modified sweetener composition and from $1/1000$ part by weight to 1000 parts by weight of rhamnose is added per part by weight of taste-unmodified sweetener composition.

2. A method as claimed in claim 1, wherein said taste-unmodified sweetener composition comprises acesulfame K and a second sweetener comprising aspartame.

3. A method as claimed in claim 1, wherein said taste-unmodified sweetener composition comprises acesulfame K and a second sweetener comprising sodium cyclamate.

4. A method as claimed in claim 1, wherein the amount of rhamnose added to each part by weight of taste-unmodified sweetener composition ranges from $1/10$ part to 10 parts by weight.

5. A method as claimed in claim 1, wherein the resulting sweetener composition is a dry product.

6. A method as claimed in claim 1, wherein the resulting sweetener composition comprises an aqueous solution.

7. A method as claimed in claim 6, wherein said aqueous solution is spray dried.

8. A method as claimed in claim 1, wherein the resulting sweetener composition comprises the acesulfame K and the rhamnose in pulverulent form.

9. A method as claimed in claim 1, wherein the taste profile of the taste-unmodified, acesulfame K-containing sweetener composition is modified by causing said profile to be fuller, more persistent, or essentially free of bitter aftertaste.

10. A method for modifying the taste profile of a taste-unmodified, acesulfame K-containing sweetener composition, so that the resulting modified sweetener composition has a harmonious and full bodied sweetness which is comparable to sucrose, said method comprising:

modifying said unmodified, acesulfame K-containing sweetener composition by adding an amount of rhamnose to said unmodified, acesulfame K-containing sweetener composition, which amount is sufficient to cause the taste profile imparted by acesulfame K to more approximately resemble the taste profile of sucrose, and obtaining thereby said modified sweetener composition and from $1/1000$ part by weight to 1000 parts by weight of rhamnose is added per part by weight of taste-unmodified sweetener composition.

11. The method as claimed in claim 10, wherein the amount of rhamnose added to each part by weight of taste-unmodified sweetener composition ranges from $1/10$ part to 10 parts by weight.

* * * * *

UNITED STATES PATENT AND TRADEMARK OFFICE
CERTIFICATE OF CORRECTION

PATENT NO. : 6,180,155 B1  Page 1 of 1
DATED : January 30, 2001
INVENTOR(S) : Andreas Lotz et al.

It is certified that error appears in the above-identified patent and that said Letters Patent is hereby corrected as shown below:

<u>Title page, Item [73] Assignee:</u>
"Nufrinova GmbH" should read -- NUTRINOVA NUTRITION SPECIALTIES & FOOD INGREDIENTS GMBH --.

Signed and Sealed this

Thirty-first Day of July, 2001

Attest:

Attesting Officer

NICHOLAS P. GODICI
*Acting Director of the United States Patent and Trademark Office*